(12) United States Patent
Kale

(10) Patent No.: US 12,327,175 B2
(45) Date of Patent: Jun. 10, 2025

(54) COLLABORATIVE SENSOR DATA PROCESSING BY DEEP LEARNING ACCELERATORS WITH INTEGRATED RANDOM ACCESS MEMORY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 1036 days.

(21) Appl. No.: 16/987,095

(22) Filed: Aug. 6, 2020

(65) Prior Publication Data

US 2022/0044101 A1 Feb. 10, 2022

(51) Int. Cl.
| | |
|---|---|
| G06F 15/16 | (2006.01) |
| G06F 9/30 | (2018.01) |
| G06F 9/50 | (2006.01) |
| G06F 13/16 | (2006.01) |
| G06F 17/16 | (2006.01) |
| G06N 3/063 | (2023.01) |
| G06N 3/08 | (2023.01) |

(52) U.S. Cl.
CPC .......... G06N 3/063 (2013.01); G06F 9/3001 (2013.01); G06F 9/5027 (2013.01); G06F 13/1668 (2013.01); G06F 15/16 (2013.01); G06F 17/16 (2013.01); G06N 3/08 (2013.01)

(58) Field of Classification Search
CPC .. G06F 9/3001; G06F 9/5027; G06F 13/1668; G06F 15/16; G06F 17/16; G06N 3/063; G06N 3/08

USPC .......................................................... 710/5
See application file for complete search history.

(56) References Cited

U.S. PATENT DOCUMENTS

| | | |
|---|---|---|
| 10,460,258 B2 | 10/2019 | Sugaya |
| 10,671,068 B1 | 6/2020 | Xu et al. |

(Continued)

FOREIGN PATENT DOCUMENTS

WO 2020122985 6/2020

OTHER PUBLICATIONS

En Li, et al. "Edge Intelligence: On-Demand Deep Learning Model Co-Inference with Device-Edge Synergy." The SIGCOMM Workshop on Mobile Edge Communication, Aug. 21-23, 2018.

(Continued)

*Primary Examiner* — Christopher B Shin
(74) *Attorney, Agent, or Firm* — Greenberg Traurig

(57) ABSTRACT

Systems, devices, and methods related to a Deep Learning Accelerator and memory are described. For example, an integrated circuit device may be configured to execute instructions with matrix operands and configured with random access memory. The random access memory is configured to store input data from a sensor, parameters of a first portion of an Artificial Neural Network (ANN), instructions executable by the Deep Learning Accelerator to perform matrix computation of the first portion of the ANN, and data generated outside of the device according to a second portion of the ANN. The Deep Learning Accelerator may execute the instructions to generate, independent of the data from the second portion of the ANN, a first output based on the input data from the sensor and generate a second output based on a combination of the data from the sensor and the data from the second portion of the ANN.

20 Claims, 12 Drawing Sheets

(56) References Cited

U.S. PATENT DOCUMENTS

| | | | |
|---|---|---|---|
| 10,678,479 B1 | 6/2020 | Diamant et al. | |
| 10,964,676 B2* | 3/2021 | Yazdani | H01L 23/36 |
| 11,144,291 B1 | 10/2021 | Zheng et al. | |
| 11,204,747 B1 | 12/2021 | Zejda et al. | |
| 11,468,984 B2* | 10/2022 | Schneider | G06N 3/045 |
| 11,720,417 B2 | 8/2023 | Kale | |
| 2003/0187618 A1 | 10/2003 | Inda et al. | |
| 2005/0047670 A1 | 3/2005 | Qian et al. | |
| 2008/0177683 A1 | 7/2008 | No et al. | |
| 2010/0076915 A1 | 3/2010 | Xu et al. | |
| 2011/0219150 A1 | 9/2011 | Piccirillo et al. | |
| 2016/0342905 A1 | 11/2016 | Ghose et al. | |
| 2017/0169208 A1 | 6/2017 | Jantz et al. | |
| 2017/0316312 A1 | 11/2017 | Goyal et al. | |
| 2018/0136912 A1 | 5/2018 | Venkataramani et al. | |
| 2018/0285719 A1 | 10/2018 | Baum et al. | |
| 2018/0285767 A1 | 10/2018 | Chew | |
| 2018/0307976 A1 | 10/2018 | Fang et al. | |
| 2018/0314945 A1 | 11/2018 | Breternitz et al. | |
| 2019/0012116 A1 | 1/2019 | Gutala et al. | |
| 2019/0034803 A1 | 1/2019 | Gotou | |
| 2019/0042224 A1 | 2/2019 | Caballero et al. | |
| 2019/0042915 A1 | 2/2019 | Akin et al. | |
| 2019/0042921 A1 | 2/2019 | Zamora Esquivel et al. | |
| 2019/0050733 A1 | 2/2019 | Bopardikar et al. | |
| 2019/0171941 A1 | 6/2019 | Quach et al. | |
| 2019/0180170 A1 | 6/2019 | Huang et al. | |
| 2019/0286972 A1 | 9/2019 | El Husseini et al. | |
| 2019/0286973 A1 | 9/2019 | Kovvuri et al. | |
| 2020/0019844 A1 | 1/2020 | Lewis et al. | |
| 2020/0026498 A1 | 1/2020 | Sumbul et al. | |
| 2020/0074202 A1 | 3/2020 | Kim et al. | |
| 2020/0133273 A1* | 4/2020 | Skorheim | G06N 3/08 |
| 2020/0184001 A1* | 6/2020 | Gu | G06N 3/063 |
| 2020/0210754 A1 | 7/2020 | Lin et al. | |
| 2020/0219015 A1 | 7/2020 | Lee et al. | |
| 2020/0226473 A1 | 7/2020 | Sharma et al. | |
| 2020/0348664 A1* | 11/2020 | Mueller | G06N 3/08 |
| 2020/0349216 A1* | 11/2020 | Das Sarma | G06F 9/30036 |
| 2020/0349362 A1* | 11/2020 | Maloney | G01S 5/16 |
| 2020/0380361 A1 | 12/2020 | Tanach | |
| 2021/0020627 A1* | 1/2021 | Farooq | H01L 25/18 |
| 2021/0206588 A1* | 7/2021 | Douglas | B07C 5/368 |
| 2021/0240615 A1* | 8/2021 | Sohn | G06F 12/0284 |
| 2021/0320967 A1 | 10/2021 | Kale et al. | |
| 2022/0043696 A1 | 2/2022 | Kale | |
| 2022/0044107 A1 | 2/2022 | Kale | |
| 2022/0279203 A1* | 9/2022 | Mangan | H04N 19/513 |
| 2023/0115494 A1 | 4/2023 | Maheshwari | |
| 2023/0153587 A1* | 5/2023 | Vogelsang | G06N 3/045 706/25 |
| 2023/0297287 A1* | 9/2023 | Zafar | G06F 3/0604 712/34 |

OTHER PUBLICATIONS

International Search Report and Written Opinion, PCT/US2021/044292, mailed on Nov. 19, 2021.

International Search Report and Written Opinion, PCT/US2021/042703, mailed on Nov. 9, 2021.

International Search Report and Written Opinion, PCT/US2021/044485, mailed on Nov. 25, 2021.

International Search Report and Written Opinion, PCT/US2021/026005, mailed on Jul. 23, 2021.

Extended European Search Report, EP21784489.3, mailed on Apr. 3, 2024.

* cited by examiner

COLLABORATIVE SENSOR DATA PROCESSING BY DEEP LEARNING ACCELERATORS WITH INTEGRATED RANDOM ACCESS MEMORY

TECHNICAL FIELD

At least some embodiments disclosed herein relate to sensor fusion in general and more particularly, but not limited to, sensor fusion implemented via accelerators for Artificial Neural Networks (ANNs), such as ANNs configured through machine learning and/or deep learning.

BACKGROUND

An Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
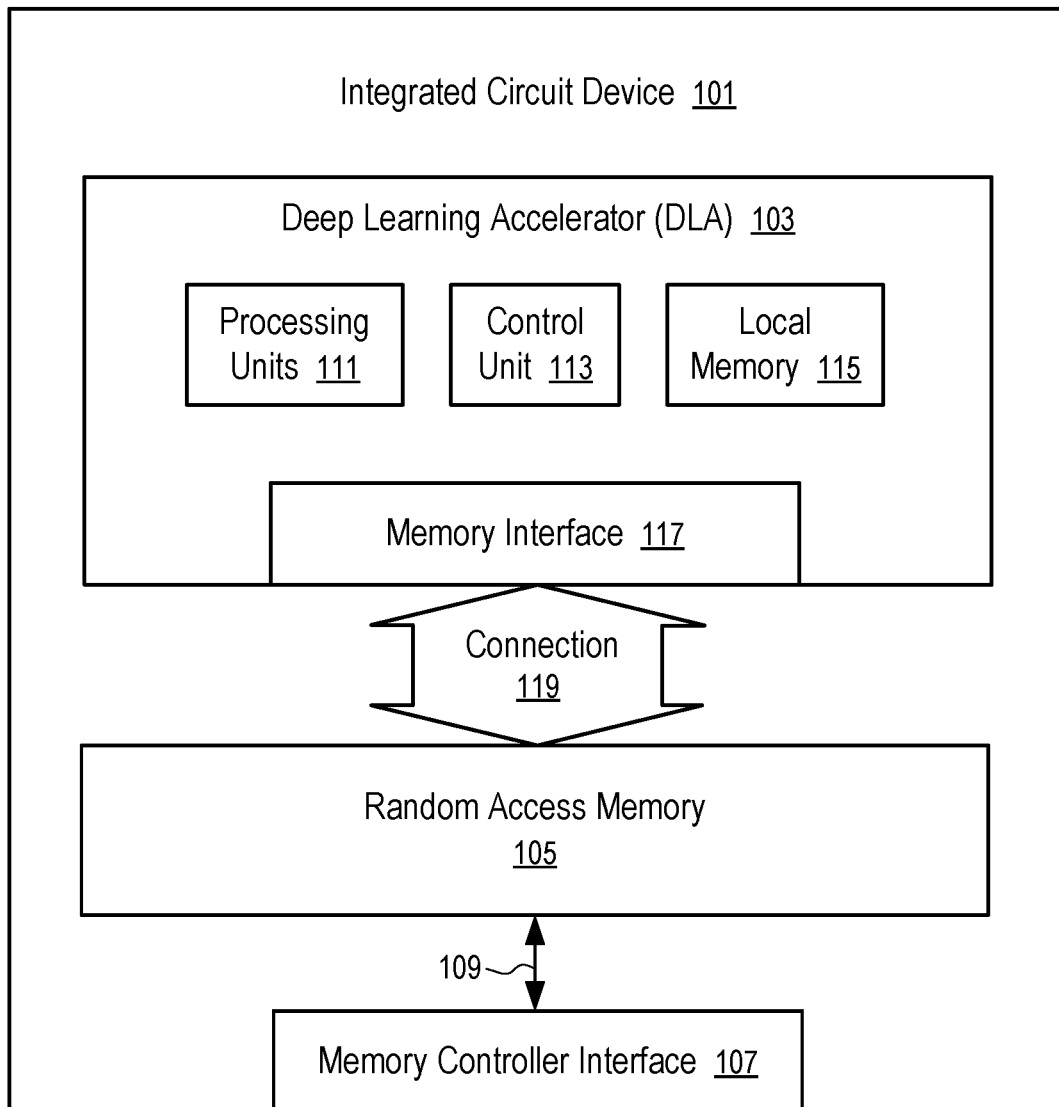
FIG. 1 shows an integrated circuit device having a Deep Learning Accelerator and random access memory configured according to one embodiment.

At least some embodiments disclosed herein provide an integrated circuit configured to perform sensor fusion using Artificial Neural Networks (ANNs) with reduced energy consumption and computation time. The integrated circuit includes a Deep Learning Accelerator (DLA) and random access memory. The random access memory is configured to store instructions and parameters for the Deep Learning Accelerator (DLA) to implement the computation of an Artificial Neural Network (ANN). A plurality of such integrated circuit devices can be used to process the sensor data from a plurality of sensors respectively based on separate Artificial Neural Networks (ANNs). Further, the integrated circuits can cooperate with each other to generate an output of an Artificial Neural Network (ANN) based on the combined sensor data from the plurality of sensors. Instructions for the Deep Learning Accelerators in the integrated circuit devices can be generated by a compiler optimizing the computation of the sensor fusion by reducing or eliminating overlapping processing between the separate Artificial Neural Networks (ANNs) for the separate processing of the data from the sensors individually, and the sensor fusion Artificial Neural Network (ANN) to generate an output based on the combined data from the sensors. For example, intermediate results from the separate Artificial Neural Networks (ANNs) can be provided as inputs to the sensor fusion Artificial Neural Network (ANN); and the inputs and further computation of sensor fusion can be dynamically distributed to one or more of the integrated circuit devices based on the workloads of the integrated circuit devices.

The Deep Learning Accelerator (DLA) includes a set of programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

The random access memory can have multiple portions configured to receive sensor data from multiple sensors respectively. The random access memory includes a further portion configured to store instructions for the Deep Learning Accelerator (DLA). The instructions have matrix operands and configured to be executed by the Deep Learning Accelerator (DLA) to implement matrix computations of the Artificial Neural Networks (ANNs). The instructions can be generated by a compiler from descriptions of Artificial Neural Networks (ANNs) to process the sensor data of the multiple sensors. At least one of the Artificial Neural Networks (ANNs) is trained to generate outputs based on the sensor data of more than one of the sensors. The instructions can be optimized by the compiler by reducing or eliminating overlapping processing in the Artificial Neural Networks (ANNs) and/or by coordinating the timing of intermediate results derived separately from different sensors. The sensor fusion results generated from the Artificial Neural Networks (ANNs) combining the input data from multiple sensors can power higher-level intelligent predictions.

Sensor fusion uses inputs from multiple sensors to generate inferences. For example, radars, lidars, cameras sensing in lights visible to human eyes and/or infrared light, and/or imaging devices sensing via ultrasound can be used to generate image data representative of a scene of objects and/or items using different technologies and/or different frequency ranges. Radar images, lidar images, camera images, and ultrasound images can each have advantages and disadvantages under different conditions. Object identification and/or recognition based on the combination of radar images, lidar images, camera images, and/or ultrasound images can be more accurate by taking advantages of the strengths of the different sensors and the additional information offered by different sensors.

Different Artificial Neural Networks can be used to process the input data of different image sensors separately. A further Artificial Neural Network can be used to process the input data of the different image sensors together. The further Artificial Neural Network can receive, as input, intermediate processing results from the different Artificial Neural Networks configured for the different image sensors respectively. A combination of the Artificial Neural Networks can be compiled into a large Artificial Neural Network that generates not only inferences separately from the inputs of the individual image sensors, but also outputs derived from the sensor data of the image sensors as a whole. Less accurate outputs from the sensor data of the individual image sensors can be generated sooner than more accurate output from the combined sensor data of the image sensors. In some instances, the outputs (e.g., features, identifications and/or classifications) recognized from the sensor data of one of the image sensors can be used to simplify or assist the processing of the sensor data of other image sensors.

When the description of the various Neural Networks are provided as inputs to a compiler, the compiler can generate a combined set of optimized instructions by reducing overlapping computations and/or coordinate the timing of the generation of the outputs from the different Artificial Neural Networks.

Thus, the Artificial Neural Networks are compiled into a single set of instructions and resources for computation in a single integrated circuit device having the Deep Learning Accelerator and random access memory. The resources can include matrices/parameters representative of the synaptic weights, biases, connectivity, and/or other parameters of artificial neurons.

Alternatively, the Artificial Neural Networks are compiled into multiple sets of instructions and resources for computation in multiple integrated circuit devices, each having a Deep Learning Accelerator and random access memory.

For example, each integrated circuit device has a Deep Learning Accelerator and random access memory storing a set of instructions and resources to at least implement the computation of an Artificial Neural Network processing the input from a particular sensor. The output of the Artificial Neural Network is independent on the input from other sensors. Further, the integrated circuit devices include the instructions and resources for the implementation of portions of a sensor fusion Artificial Neural Network that generates an output based on the combined sensor data from the multiple sensors. Intermediate results from other integrated circuit devices can be used as input to the portions of the sensor fusion Artificial Neural Network to reduce data communication and/or overlapping computations. Further, the computation of a portion of the sensor fusion Artificial Neural Network can be dynamically assigned to a selected one in the set of integrated circuit devices. The assignment can be made based on the current or predicted workloads of the integrated circuit devices, and/or the communication cost of transmitting the intermediate results. Thus, the integrated circuit devices can generate the sensor fusion output through cooperation.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory controller interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a predefined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
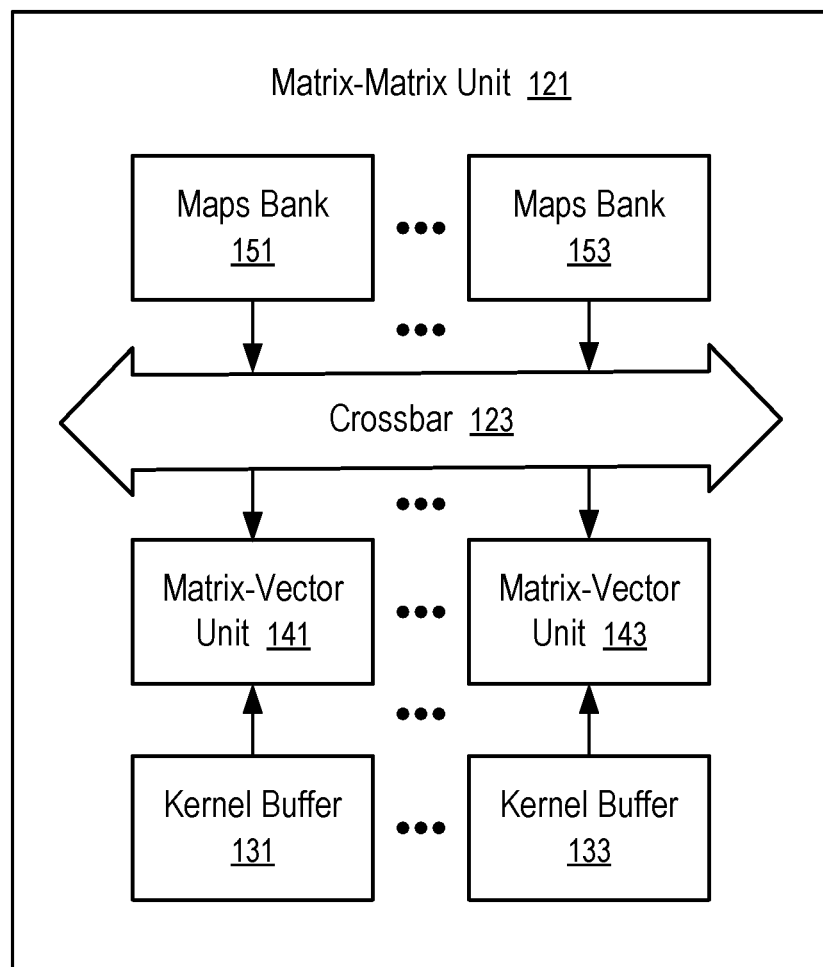
FIG. 2 shows a processing unit configured to perform matrix-matrix operations according to one embodiment.

FIG. 2 shows a processing unit configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
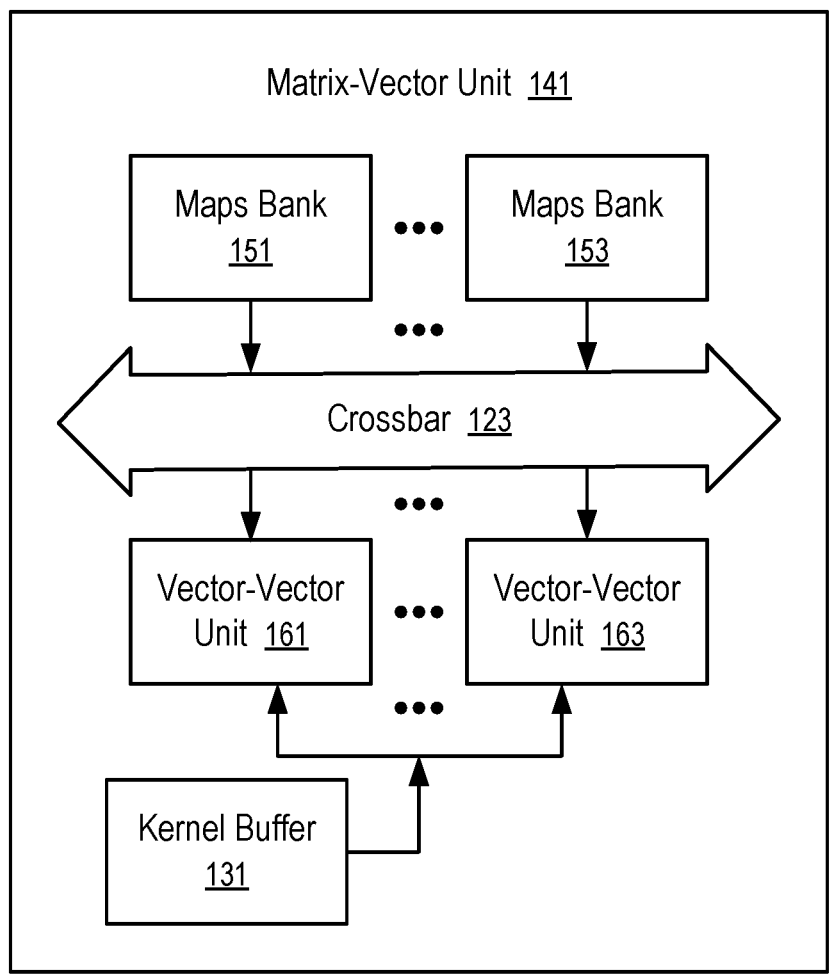
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
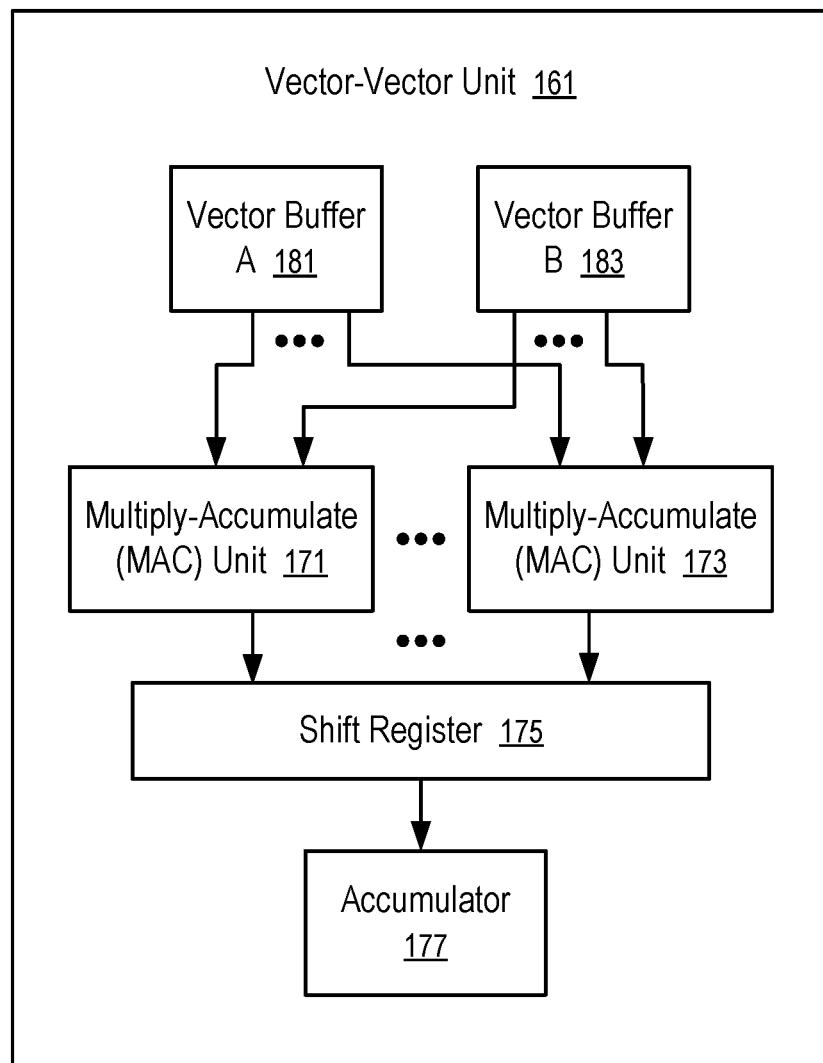
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate units (171 to 173). Each of the multiply-accumulate units (e.g., 173) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate units (171 to 173) as input. The multiply-accumulate units (171 to 173) can receive multiple pairs of numbers from the vector buffers (181 and 183) in parallel and perform the multiply-accumulate (MAC) operations in parallel. The outputs from the multiply-accumulate units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate units (171 to 173) in the vector-vector unit (161). When the length of the vector buffers (181 and 183) is the multiple of the count of multiply-accumulate units (171 to 173), a number of pairs of inputs, equal to the count of the multiply-accumulate units (171 to 173), can be provided from the vector buffers (181 and 183) as inputs to the multiply-accumulate units (171 to 173) in each iteration; and the vector buffers (181 and 183) feed their elements into the multiply-accumulate units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
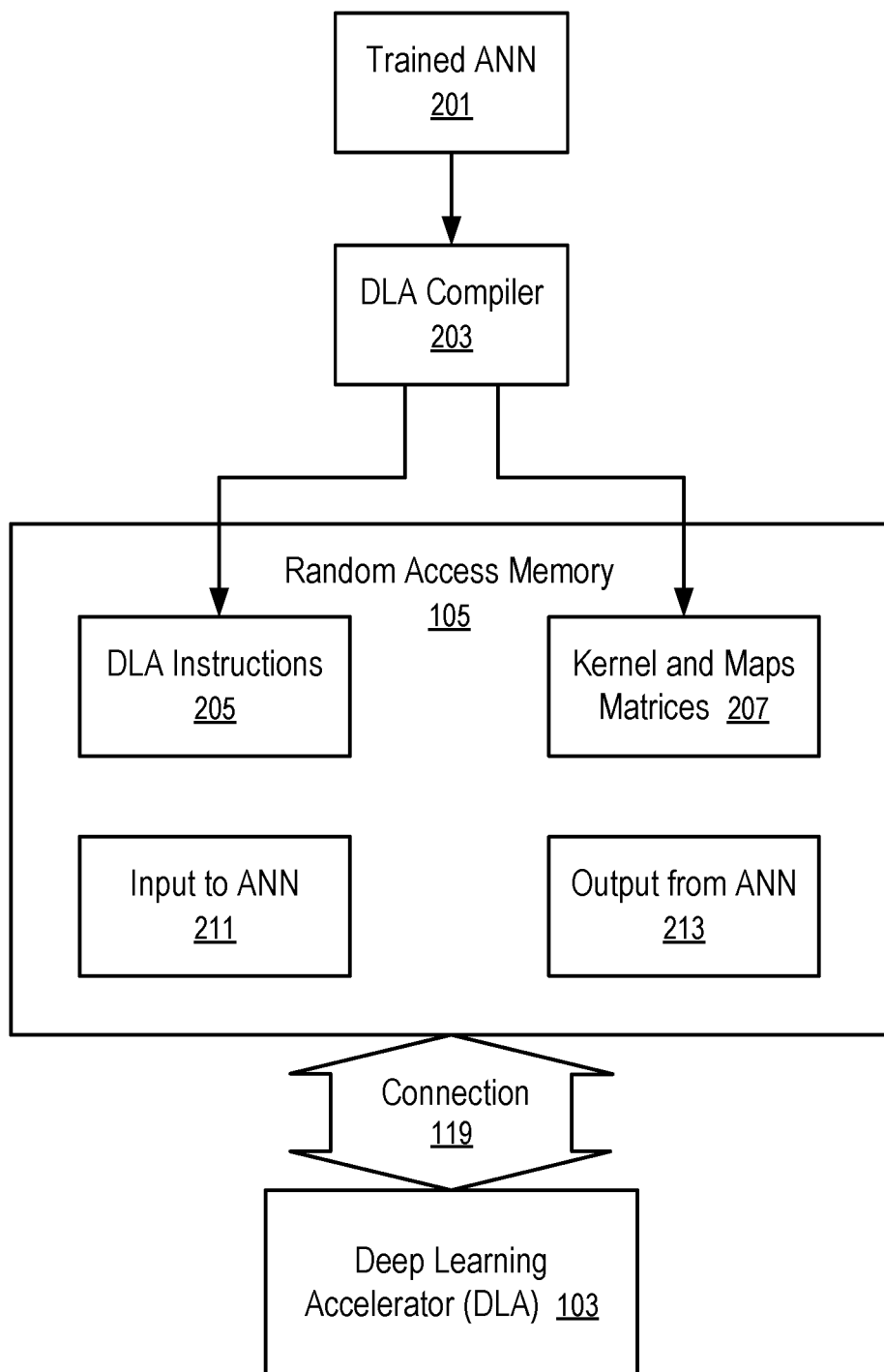
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (ANN) (201) that has been trained through machine learning (e.g., deep learning) can be described in a standard format (e.g., Open Neural Network Exchange (ONNX)). The description of the trained Artificial Neural Network (ANN) (201) in the standard format identifies the properties of the artificial neurons and their connectivity.

In FIG. 5, a Deep Learning Accelerator (DLA) compiler (203) converts trained Artificial Neural Network (ANN) (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained Artificial Neural Network (ANN) (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained Artificial Neural Network (ANN) (201) to process an input (211) to the trained Artificial Neural Network (ANN) (201) to generate the corresponding output (213) of the trained Artificial Neural Network (ANN) (201) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs to Artificial Neural Network (ANN) (201) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained Artificial Neural Network (ANN) (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained Artificial Neural Network (ANN) (201) performed according to the instructions (205), the Deep Learning Accelerator (DLA) (103) stores the output (213) of the Artificial Neural Network (ANN) (201) at a pre-defined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained Artificial Neural Network (ANN) (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device (e.g., 101) can be accessed using an interface (107) of the computing device (e.g., 101) to a memory controller. The computing device (e.g., 101) can have processing units (e.g., 111) configured to perform at least computations on matrix operands, such as a matrix operand stored in maps banks (151 to 153) and a matrix operand stored in kernel buffers (131 to 133).

For example, the computing device (e.g., 101) can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (07) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device (e.g., 101) can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands (e.g., matrices (207)) from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

Figure 6:
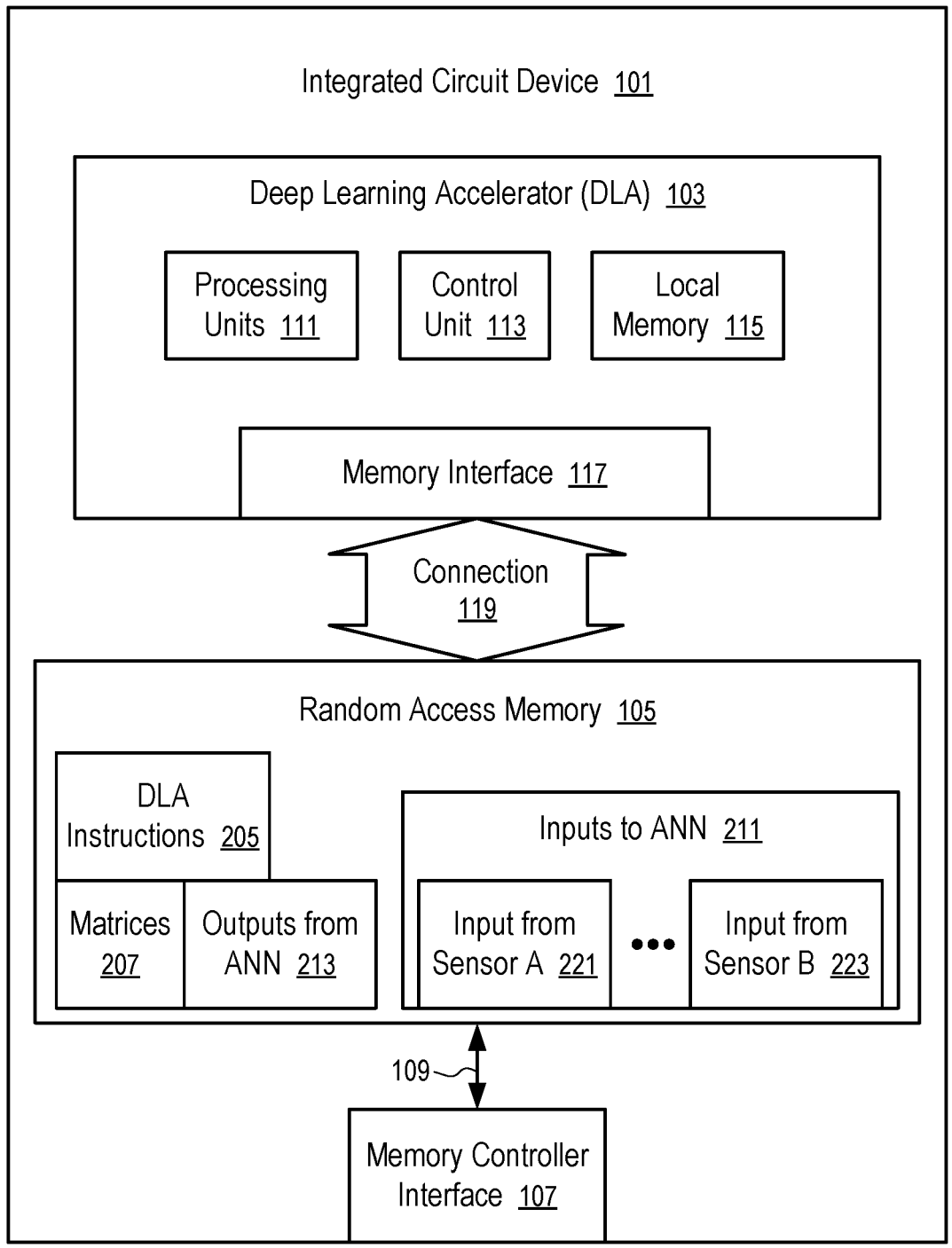
FIGS. 6-8 illustrate sensor fusion implemented in a Deep Learning Accelerator and random access memory configured according to some embodiments.
Figure 7:
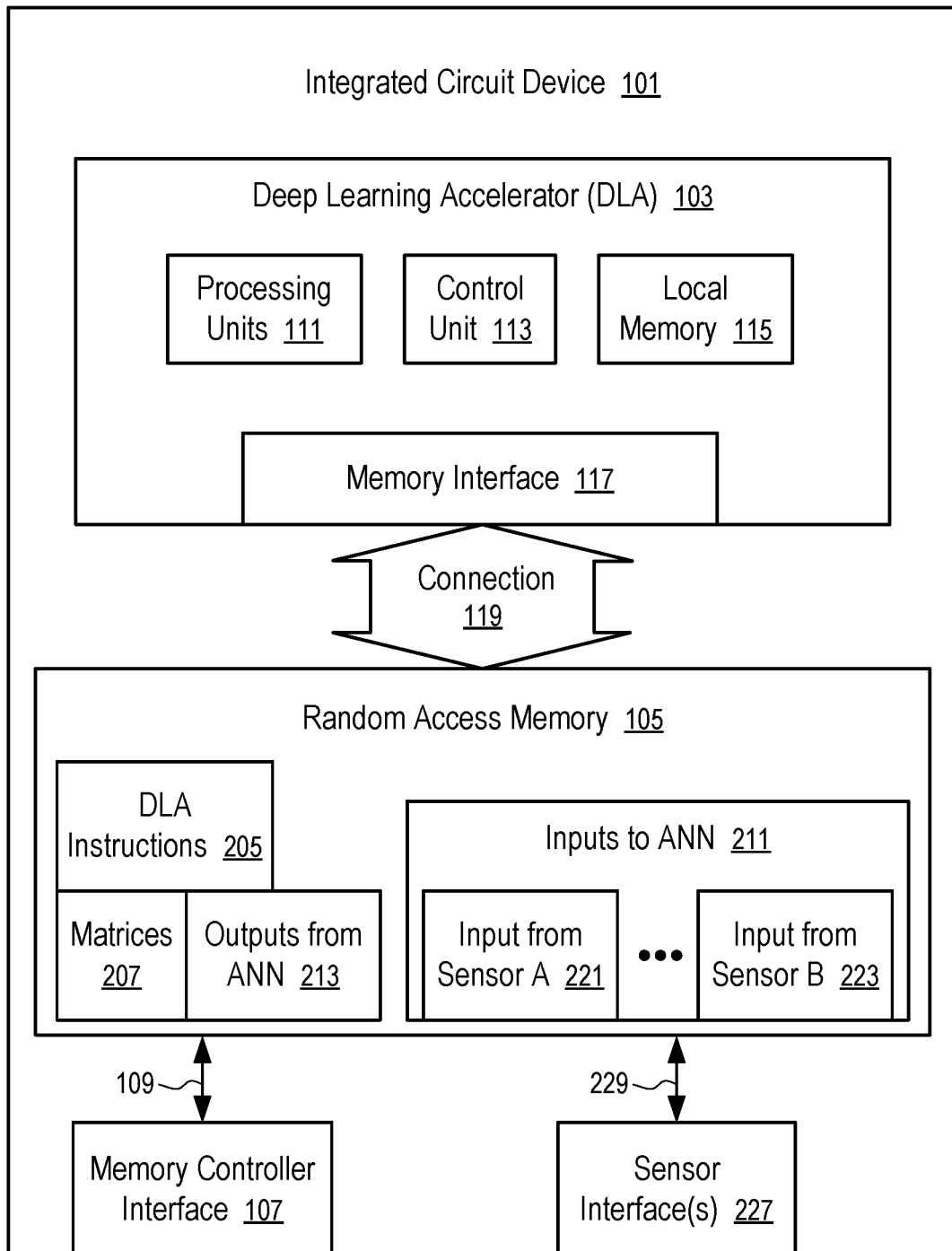
Figure 8:
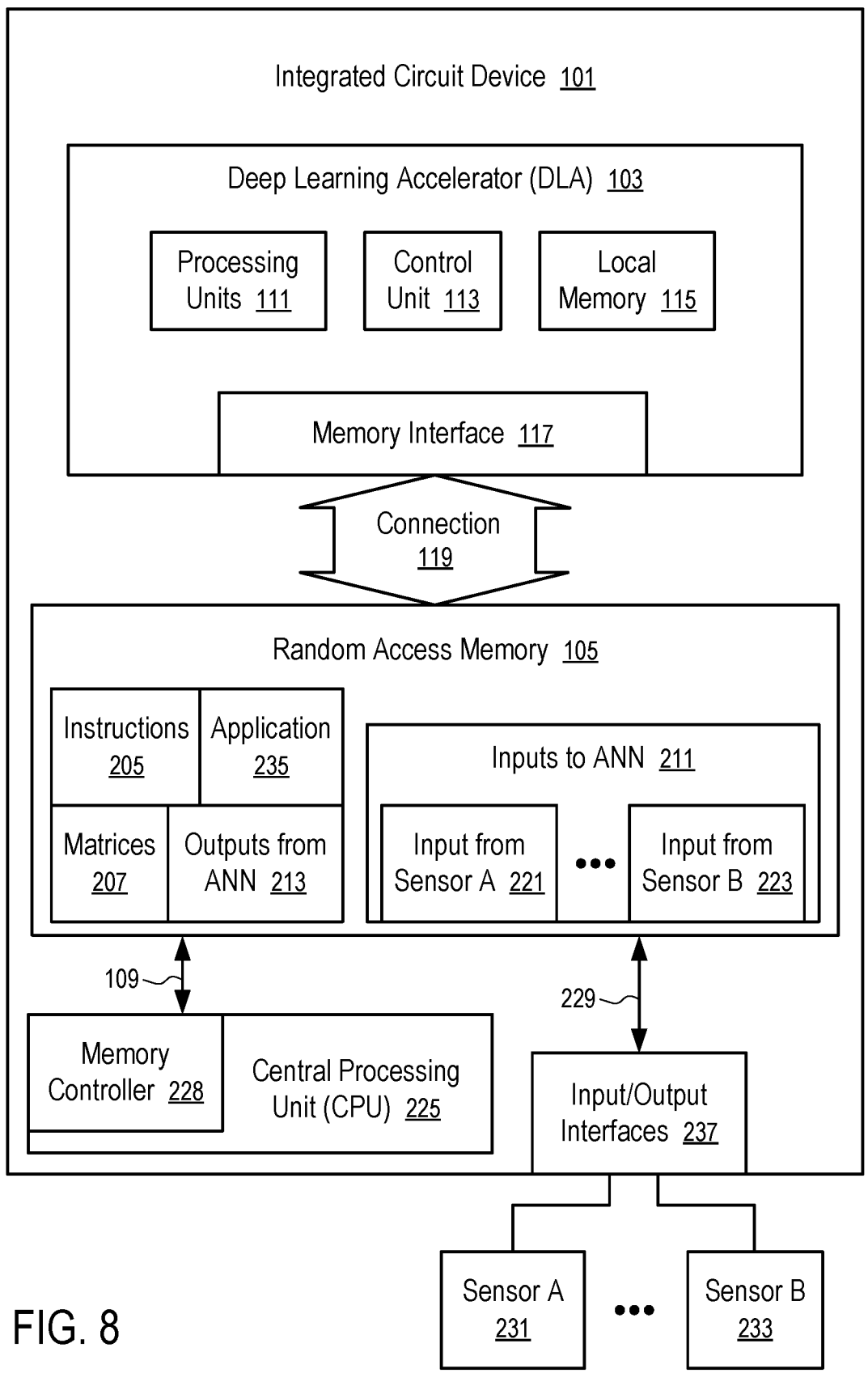

FIGS. 6-8 illustrate sensor fusion implemented in a Deep Learning Accelerator and random access memory configured according to some embodiments.

In FIG. 6, the Random Access Memory (RAM) (105) includes a portion configured to accept the input (211) to the Artificial Neural Network (ANN) (201). The portion of the Random Access Memory (RAM) (105) is partitioned into a plurality of slots for accepting inputs from different types of sensors, such as radar, lidar, camera, and/or ultrasound imaging device.

For example, each of the slots can be configured to accept an input from a predefined type of sensors. For example, a slot of the input (211) to the Artificial Neural Network (ANN) (201) can be reserved for the input (221) from sensor A (e.g., representative of radar images or lidar images); and another slot of the input (211) to the Artificial Neural Network (ANN) (201) can be reserved for the input (223) from sensor B (e.g., representative of camera images or ultrasound images).

In some implementations, which slot is used for the sensor data of what type is dynamically specified in the Random Access Memory (RAM) (105). For example, a slot in the Random Access Memory (RAM) (105) can be initially used to store an input (221) from sensor A (e.g., representative of radar images or lidar images) and subsequently reallocated to store an input (223) from sensor B (e.g., representative of camera images or ultrasound images). For example, the input (221) from sensor A can include data identifying its type of input (e.g., radar image stream); and the input (223) from sensor B can include data identifying its type of input (e.g., camera image stream).

The DLA instructions (205) generated by the DLA compiler (203) can be configured to dynamically apply the sensor inputs (e.g., 221) to the corresponding input neurons of the Artificial Neural Network (ANN) (201) based on the types of the inputs (e.g., 221) specified for the slot. The input neurons correspond to predetermined portions of the matrices (207), as identified via the DLA instructions (205).

Alternatively, the input slots in Random Access Memory (RAM) (105) can be pre-allocated for predetermined types of sensors. For example, during a startup process, the types of sensors connected to the sensor interface(s) (227) of integrated circuit device (101) are identified. The slots are allocated respectively for the sensors to store their inputs (e.g., 223).

The output (213) from the Artificial Neural Network (ANN) (201) can include outputs derived from the inputs (221, ..., 223) respectively for the different sensors, such as outputs recognized from radar images, outputs recognized from lidar images, output recognized from camera images, etc.

Further, the output (213) from the Artificial Neural Network (ANN) (201) can include an output generated from the sensor fusion of the inputs (221, ..., 223), such as identifications or classifications of one or more objects recognized from a combination of radar images, lidar images, camera images, and/or ultrasound images, etc.

For example, the execution of the DLA instructions (205) generates radar image features, lidar image features, camera image features. Further, the execution of the DLA instructions (205) generates sensor fusion features identified or recognized based on a combination of the radar image features, the lidar image features, the camera image features, etc.

For example, the execution of the DLA instructions (205) generates identifications of an object determined from a radar image, a lidar image, a camera image respectively. The radar identification of the object is determined from the radar image features; the lidar identification of the object is determined from the lidar image features; and the camera identification is determined from the camera image features. Further, the execution of the DLA instructions (205) generates a sensor fusion identification of the object that is identified or recognized based on a combination of a radar image, a lidar image, a camera image, etc. For example, the sensor fusion identification of the object can be determined from a combination of radar image features, lidar image features, camera image features, etc.

In FIG. 6, the different sensors write the inputs (221, ..., 223) into the Random Access Memory (RAM) (105) using a memory controller interface (107). For example, a host system, a processor, or a direct memory access (DMA) controller can use the memory controller interface (107) to store the inputs (221, ..., 223) into the respective slots in the Random Access Memory (RAM) (105) on behalf of the different sensors. The host system or the processor can use the memory controller interface (107) to retrieve the output (213) from the Artificial Neural Network (ANN) (201).

Alternatively, one or more sensor interfaces can be provided to allow one or more sensors to stream inputs (e.g., 221) into the Random Access Memory (RAM) (105). The sensor interfaces can be used independent on the host system/processor using the memory controller interface (107) to access the output (213) from the Artificial Neural Network (ANN) (201), as illustrated in FIG. 7.

In FIG. 7, one or more sensor interfaces (227) are provided to allow one or more sensor devices to write inputs (221, ..., 223) into the Random Access Memory (RAM) (105). For example, radar, lidar, and a camera can write parallel streams of radar images, lidar images and camera images into the Random Access Memory (RAM) (105). For example, one sensor (e.g., radar) can use a serial connection to a dedicated sensor interface (e.g., 227) to write its input (e.g., 221) into the Random Access Memory (RAM) (105); and another sensor (e.g., camera or lidar) can use another serial connection to another dedicated interface to write its input (e.g., 223) into the Random Access Memory (RAM) (105). The inputs (e.g., radar images and camera images) can be written into the Random Access Memory (RAM) (105) concurrently.

FIG. 7 illustrates an example in which the connections (109 and 229) connect the memory controller interface (107) and the sensor interface(s) (227) to the Random Access Memory (RAM) (105) directly. Alternatively, the connection (109) and the connection (229) can be configured to connect the memory controller interface (107) and the sensor interface(s) (227) to the Random Access Memory (RAM) (105) indirectly through the memory interface (117) and/or the high bandwidth connection (119) between the Deep Learning Accelerator (DLA) (103) and the Random Access Memory (RAM) (105).

The integrated circuit device (101) of FIG. 8 includes a Central Processing Unit (CPU) (225). The Central Processing Unit (CPU) (225) can execute instructions like a typical host system/processor. Thus, the Random Access Memory (RAM) (105) can store not only DLA instructions (205) for execution by Deep Learning Accelerator (DLA) (103), but also instructions of an application (235) for execution by the Central Processing Unit (CPU) (225).

The integrated circuit device (101) of FIG. 8 has one or more input/output interfaces (237). Sensors (231, ..., 233) can stream their inputs into the Random Access Memory (RAM) (105) through the one or more input/output interfaces (237). For example, the sensor A (231) can stream its input (221) from sensor A (e.g., representative of radar images or camera images) into the Random Access Memory (RAM) (105) (e.g., to provide radar images or camera images); and the sensor B (233) can stream its input (223) from sensor B into the Random Access Memory (RAM) (105) (e.g., to provide lidar images or ultrasound images).

Further, the application (235) running in the Central Processing Unit (CPU) (225) can use the input/output interfaces (237) to generate alerts, audio/video outputs, network communication signals, and/or control commands for peripheral devices.

FIG. 8 illustrates an example in which the connections (109 and 229) connect the memory controller (228) and the input/output interfaces (237) to the Random Access Memory (RAM) (105) directly. Alternatively, the connection (109) and the connection (229) can be configured to connect the memory controller (228) and the input/output interface(s) (237) to the Random Access Memory (RAM) (105) indirectly via the memory interface (117) and the high bandwidth connection (119) between the Deep Learning Accelerator (DLA) (103) and the Random Access Memory (RAM) (105). In other implementations, the input/output interfaces (237) access the Random Access Memory (RAM) (105) via the memory controller (228), the Central Processing Unit (CPU) (225), or another controller.

For example, the input/output interfaces (237) can be configured to support serial connections to peripheral devices, such as radar, lidar, camera, display device, etc. For example, the input/output interfaces (237) can include a peripheral component interconnect express (PCIe) interface, a universal serial bus (USB) interface, a Mobile Industry Processor Interface (MIPI), and/or a camera interface, etc.

In one embodiment of sensor fusion, first data representative of parameters of an artificial neural network (201) is stored into random access memory (105) of a device (e.g., 101). For example, the parameters can include kernel and maps matrices (207) of the artificial neural network (201) trained using a machine learning and/or deep learning technique.

Second data representative of instructions (e.g., 205) executable to implement matrix computations of the artificial neural network (201) is stored into the random access memory (105) of the device (e.g., 101). The matrix computations are implemented using at least the first data stored in the random access memory (105).

At least one interface of the device (e.g., 101) receives third data representative of a plurality of inputs from a plurality of sensors respectively.

For example, the at least one interface can include the memory controller interface (107) illustrated in FIGS. 6-8, sensor interface(s) (227) illustrated in FIG. 7, and/or input/output interfaces (237) illustrated in FIG. 8.

For example, the plurality of inputs can include inputs (221, . . . , 223) illustrated in FIGS. 6-8; and the plurality of sensors can include sensors (231, . . . , 233) illustrated in FIG. 8.

For example, the at least one interface can include a plurality of interfaces configured to receive the plurality of inputs (e.g., 221, . . . , 223) from the plurality of sensors (e.g., 231, . . . , 233) in parallel. A plurality of serial connections can connect the plurality of interfaces to the plurality of sensors (e.g., 231, . . . , 233) respectively.

The at least one interface stores, into the random access memory (105) of the device, the third data representative of the plurality of inputs from the plurality of sensors respectively.

At least one processing unit (111) of the device (e.g., 101) executes the instructions (e.g., 205) represented by the second data to implement the matrix computations of the artificial neural network (201) having a plurality of first portions and a second portion.

The device (e.g., 101) generates first outputs corresponding to the plurality of sensors respectively according to the plurality of the first portions of the artificial neural network (201) by processing the plurality of inputs from the plurality of sensors respectively.

The device (e.g., 101) generates a second output according to the second portion of the artificial neural network (201) by processing a combination of the plurality inputs from the plurality of sensors.

For example, an input from each of the plurality of sensors can include image data of a same object; the first outputs include identifications or classifications of the object determined using the plurality of sensors respectively; and the second output includes an identification or classification of the object determined using a combination of the plurality of sensors.

For example, the first portions of the artificial neural network (201) generates the first outputs that include features recognized from the plurality of inputs from the plurality of sensors respectively. The second portion of the artificial neural network (201) generates the second output that includes an identification or classification of the object determined using a combination of the features in the first outputs.

For example, the plurality of sensors can include at least two imaging devices, such as a radar imaging device, a lidar imaging device, an ultrasound imaging device, a digital camera, etc.

Optionally, the integrated circuit device (101) can further include a central process unit configured to execute instructions of an application (235) stored in the random access memory (105). An interface of the device is configured to provide an output of the application (235) generated by the central processing unit (225) based on the outputs (213) of the artificial neural network (201). For example, the output of the application (235) can be provided to a peripheral device, such as a display device, a control element, a computer network, etc.

FIGS. 6-8 illustrate the techniques to implement sensor fusion in a single integrated circuit device (101).

Alternatively, the processing of sensor data from multiple sensors and/or sensor fusion computation can be implemented using multiple integrated circuit device (101).

Figure 9:
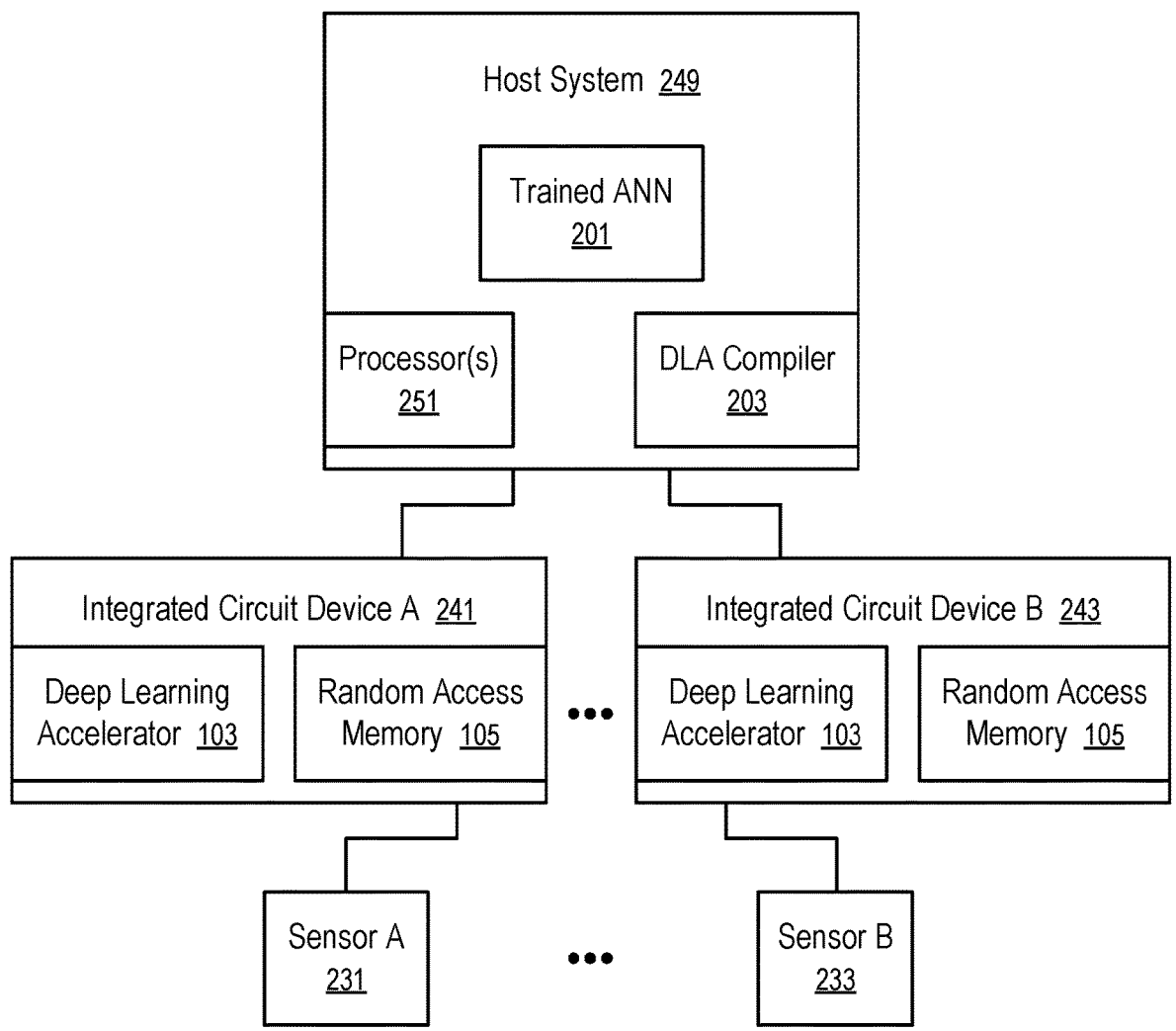
FIGS. 9-11 illustrate collaborative sensor data processing by Deep Learning Accelerators with random access memory configured according to some embodiments.
Figure 10:
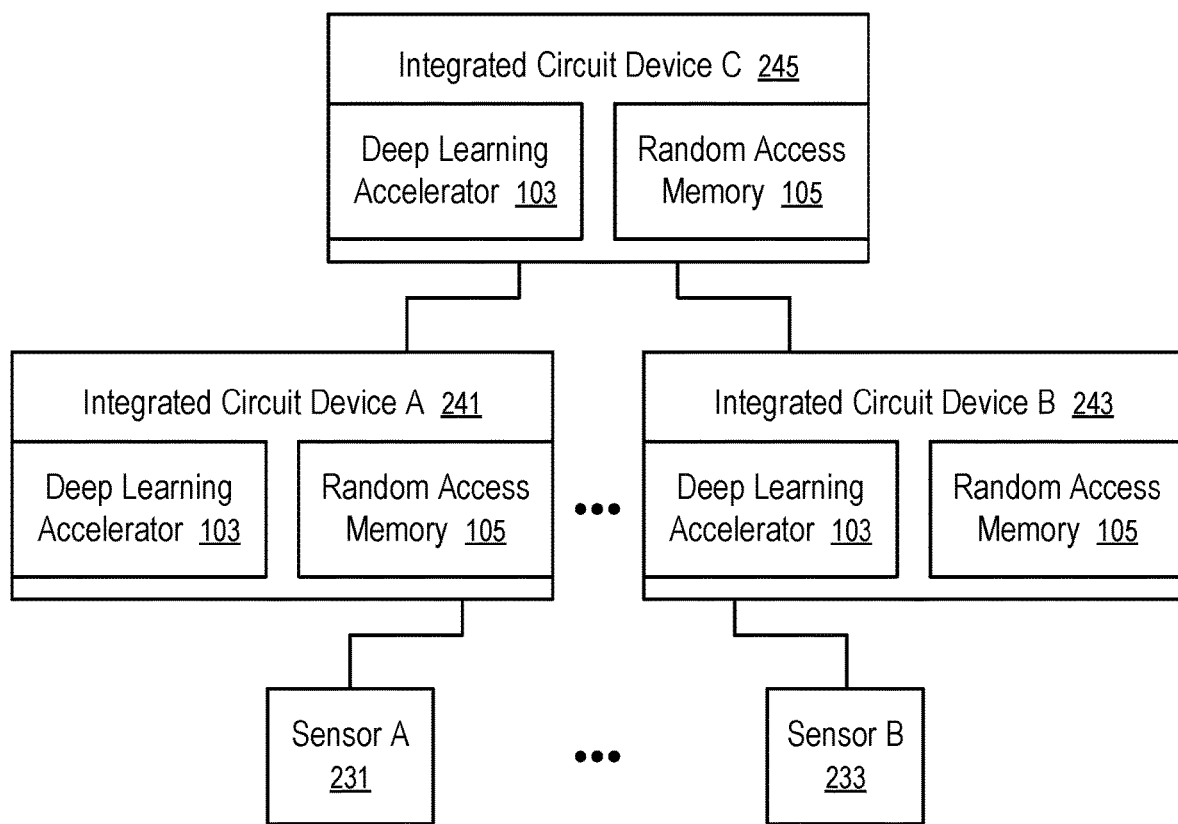
Figure 11:
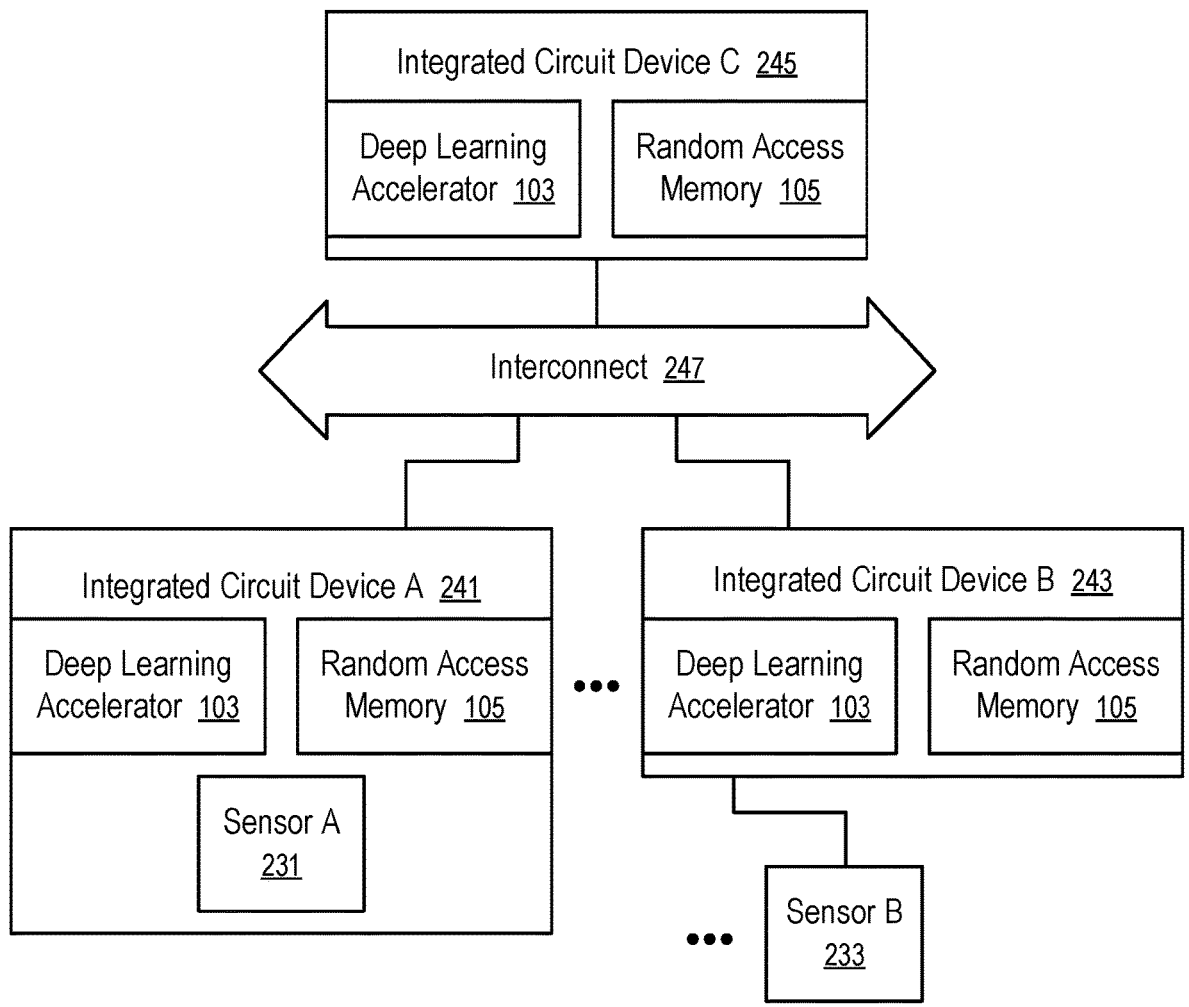

FIGS. 9-11 illustrate collaborative sensor data processing by Deep Learning Accelerators with random access memory configured according to some embodiments.

In FIG. 9, a plurality of integrated circuit devices (e.g., 241, . . . , 243) are configured to be connected to separate sensors (e.g., 231, . . . , 233).

Each of the integrated circuit devices (e.g., 241, . . . , 243) can include a Deep Learning Accelerator (DLA) (103) and a Random Access Memory (RAM) (105), in a way similar to the integrated circuit device (101) of FIGS. 1 and 6-8, or the computing system of FIG. 5.

Each of the integrated circuit devices (e.g., 241, . . . , 243) can be configured to process the input from its one or more primary sensors.

For example, integrated circuit device A (241) can be configured to receive inputs from sensor A (231); and integrated circuit device B (243) can be configured to receive inputs from sensor B (233). The inputs generated by sensor A (231) are not stored into the Random Access Memory (RAM) (105) of integrated circuit device B (243); and the inputs generated by sensor B (233) are not stored into the Random Access Memory (RAM) (105) of integrated circuit device A (241).

The DLA compiler (203) in the host system generates DLA instructions (205) and matrices (207) that are stored in the Random Access Memory (RAM) (105) of each of the integrated circuit devices (e.g., 241, . . . , 243). The DLA compiler (203) can be implemented as a software application running in the processor(s) (251) in the host system (249) that controls or uses the integrated circuit devices (e.g., 241, . . . , 243).

The Artificial Neural Network (ANN) (201) can include a portion to process the input from the sensor A (231). The processing of such a portion is identified to be independent from the inputs from other sensors (e.g., 233). Thus, the DLA compiler (203) can generate, from such a portion of the Artificial Neural Network (ANN) (201), a set of DLA instructions (205) and matrices (207) for storing in the Random Access Memory (RAM) (105) of the integrated circuit device A (241). The output of such a portion can include inferences results of the Artificial Neural Network (ANN) (201) generated using the sensor A (231) without using other sensors (e.g., 233). The output of such a portion can further include intermediate results (e.g., features, identifications, classifications) that are further processed in one or more additional sensor fusion portions of the Artificial Neural Network (ANN) (201). A sensor fusion portion of the Artificial Neural Network (ANN) (201) includes computations that are dependent on sensors connected to multiple integrated circuit devices (e.g., 241, . . . , 243).

Similarly, the Artificial Neural Network (ANN) (201) can include a portion to process the input from the sensor B (233). The processing of such a portion is identified to be independent from the inputs from other sensors (e.g., 231). Thus, the DLA compiler (203) can generate, from such a portion of the Artificial Neural Network (ANN) (201), a set of DLA instructions (205) and matrices (207) for storing in the Random Access Memory (RAM) (105) of the integrated circuit device B (243). The output of such a portion can include inferences results of the Artificial Neural Network (ANN) (201) generated using the sensor B (233) without using other sensors (e.g., 231). The output of such a portion can further include intermediate results (e.g., features, identifications, classifications) that are further processed in one or more additional sensor fusion portions of the Artificial Neural Network (ANN) (201).

A sensor fusion portion of the Artificial Neural Network (ANN) (201) uses inputs from sensors connected different integrated circuit devices (e.g., 241, . . . , 243). The DLA compiler (203) can generate, from such a sensor fusion portion of the Artificial Neural Network (ANN) (201), a set of DLA instructions (205) and matrices (207) for at least one of the integrated circuit devices (e.g., 241, . . . , 243).

For example, the sensor fusion portion can include processing based on the inputs from the sensor A (231) and the sensor B (233). The DLA compiler (203) generates and stores a set of DLA instructions (205) and matrices (207) into the Random Access Memory (RAM) (105) of the integrated circuit device A (241). The DLA instructions (205) can be configured to use the intermediate results, generated using sensor A (231) and sensor B (233) in integrated circuit device A (241) and integrated circuit device B (243) respectively, to generate a sensor fusion output.

Further, the DLA compiler (203) generates and stores a set of instructions for the communication of the intermediate results from integrated circuit device B (243) to integrated circuit device A (241). For example, the set of instructions can be configured in the integrated circuit device B (243) to write its intermediate results into the Random Access Memory (RAM) (105) of the sensor A (231). Thus, during the communication of the intermediate results, the integrated circuit device B (243) can function in a way like a virtual sensor that provides the intermediate results computed by the integrated circuit device B (243) from the inputs from the sensor B (233). Alternatively, a set of instructions can be configured in the integrated circuit device A (241) to read the intermediate results from the Random Access Memory (RAM) (105) 105 of the sensor B (233). In some embodiments, instructions are stored into both the integrated circuit device A (241) and integrated circuit device B (243) to coordinate the communication of the intermediate results from the integrated circuit device B (243) to the integrated circuit device A (241). In other implementations, the host system (249) communicates with the integrated circuit devices (e.g., 241, . . . , 243) to coordinate, initiate, and/or control the communication of the intermediate results.

In some implementations, a sensor fusion portion is implemented in more than one of the integrated circuit devices (e.g., 241, . . . , 243). For example, the sensor fusion portion using the sensor A (231) and sensor B (233) can be implemented in both integrated circuit device A (241) and integrated circuit device B (243). The intermediate results generated using the input from the sensor A (231) can be stored into the integrated circuit device B (243) for a sensor fusion output; and the intermediate results generated using the input from the sensor B (233) can be stored into the integrated circuit device A (241) for a redundant sensor fusion output. Thus, the sensor fusion output can be obtained from either the integrated circuit device A (241) or the integrated circuit device B (243), whichever generates the sensor fusion output first. In some implementations, the consistency between the redundant outputs is checked for improved reliability.

Typically, the intermediate results generated by a portion of the Artificial Neural Network (ANN) (201) from the input of a sensor (e.g., 233 or 231) is smaller than the original input of the sensor. Thus, transmitting the intermediate results for sensor fusion can reduce the computation load by avoiding overlapping computations and can reduce the communication delay and/or the communication bandwidth requirement.

Optionally, the DLA compiler (203) can break the Artificial Neural Network (ANN) (201) to organize multiple sensor fusion portions. The sensor fusion portions can be distributed to the integrated circuit devices (e.g., 241, . . . , 243) for optimized performance and load balancing.

In some implementations, each of the integrated circuit devices (e.g., 241, . . . , 243) can include the instructions and resources for implement various portions of the Artificial Neural Network (ANN) (201). The integrated circuit devices (e.g., 241, . . . , 243) can communicate with each other to dynamically negotiate the transfer of intermediate results and/or to execute instructions for the processing of selected portions of the Artificial Neural Network (ANN) (201), as illustrated in FIG. 10.

In FIG. 10, integrated circuit devices (e.g., 241, . . . , 243, . . . , 245) cooperate with each other in implementing an Artificial Neural Network (ANN) (201) that has one or more sensor fusion portions.

For example, the computation of a sensor fusion portion of the Artificial Neural Network (ANN) (201) can be implemented in the integrated circuit device C (245), which receives intermediate results other devices, such as integrated circuit device A (241) and integrated circuit device B (243).

For example, the integrated circuit device A (241) and integrated circuit device B (243) can function as high level sensors that generate inputs for a sensor fusion portion of the Artificial Neural Network (ANN) (201) can be implemented in the integrated circuit device C (245). Optionally, a further sensor can be connected to provide inputs to the integrated circuit device C (245).

Optionally, a portion of the Artificial Neural Network (ANN) (201) implemented in the integrated circuit device C (245) further predicts the workloads and timings of results from a sensor fusion portion of the Artificial Neural Network (ANN) (201) can be implemented in the integrated circuit device C (245) and assign the computation task of the sensor fusion portion of the Artificial Neural Network (ANN) (201) to one of the integrated circuit devices (e.g., 241, . . . , 243, . . . , 245).

For example, when the computation task of the sensor fusion portion of the Artificial Neural Network (ANN) (201) is assigned to the integrated circuit device A (241), the integrated circuit device C (245) can coordinate, initiate, and/or control the transmission of intermediate results to the integrated circuit device A (241) (e.g., from integrated circuit device B (243)).

In some implementations, when the computation task of the sensor fusion portion of the Artificial Neural Network (ANN) (201) is assigned to the integrated circuit device A (241), the integrated circuit device C (245) writes the instructions and the resources for the implementation of the sensor fusion portion into the Random Access Memory (RAM) (105) of the integrated circuit device A (241).

Alternatively, the instructions and the resources are preconfigured in each of the integrated circuit devices (e.g., 241, . . . , 243, . . . , 245). The availability of the intermediate results in an integrated circuit device (e.g., 241 or 243) can trigger the execution of the instructions for the implementation of the sensor fusion portion.

In some implementations, one of the integrated circuit devices (e.g., 241, . . . , 243, . . . , 245) can be elected to be the controller to coordinate data flow and execution of the instructions of the sensor fusion portion.

Alternatively, a messaging system is used by the integrated circuit devices (e.g., 241, . . . , 243, . . . , 245) to announce the availability of intermediate results, request for the intermediate results, and/or assign the computation task of the sensor fusion portion.

Optionally, one of the integrated circuit devices (e.g., 241, . . . , 243, . . . , 245) includes a Central Processing Unit (CPU) (225), as illustrated in FIG. 8.

For example, the application (235) running in the Central Processing Unit (CPU) (225) can include the DLA compiler (203) for generating and/or distributing the DLA instructions (205) and matrices (207) to the integrated circuit devices (e.g., 241, . . . , 243, . . . , 245).

For example, the application (235) running in the Central Processing Unit (CPU) (225) can monitor and/or predict the workloads of the integrated circuit devices (e.g., 241, . . . , 243, . . . , 245) and dynamically assign and/or reassign sensor fusion computation to one or more of the integrated circuit devices (e.g., 241, . . . , 243, . . . , 245).

In some implementations, a sensor can be integrated inside an integrated circuit device having a Deep Learning Accelerator (DLA) (103) and Random Access Memory (RAM) (105), as illustrated in FIG. 11.

In FIG. 11, integrated circuit devices (e.g., 241, . . . , 243, . . . , 245) are connected via an interconnect (247), such as a network, or a bus, or a set of peer to peer connections. A sensor A (231) is integrated and/or packaged within an integrated circuit device A (241) for improved data communication connection for the inputs of the sensor A (231).

For example, the sensor A (231) can be an image sensor that generates a large amount of data to be processed by a portion of the Artificial Neural Network (ANN) (201) to recognize objects, features, identifications and/or classifications in the images from the image sensor. Thus, the integrated circuit device A (241) can be used alone to provide inferences results when other sensors (e.g., 233) are not available and/or not functional.

For example, the integrated circuit device A (241) can be configured in a digital camera and optionally used with other sensors for sensor fusion. Such a digital camera can be used as an intelligent imaging device.

For example, the sensor B (233) can be a radar imaging device; and the integrated circuit device B (243) can be configured in the radar imaging device to provide recognized objects, features, identifications and/or classifications in the radar image. Such a radar imaging device can be used as an intelligent imaging device.

Similarly, an integrated circuit device (e.g., 101 or 245) having a Deep Learning Accelerator (DLA) (103) with Random Access Memory (RAM) (105) can be configured in an ultrasound imaging device, a lidar device, or a digital camera.

When two or more such intelligent imaging devices are connected, the integrated circuit device (e.g., 101 or 245) can be further configured to perform cooperative sensor fusion.

Figure 12:
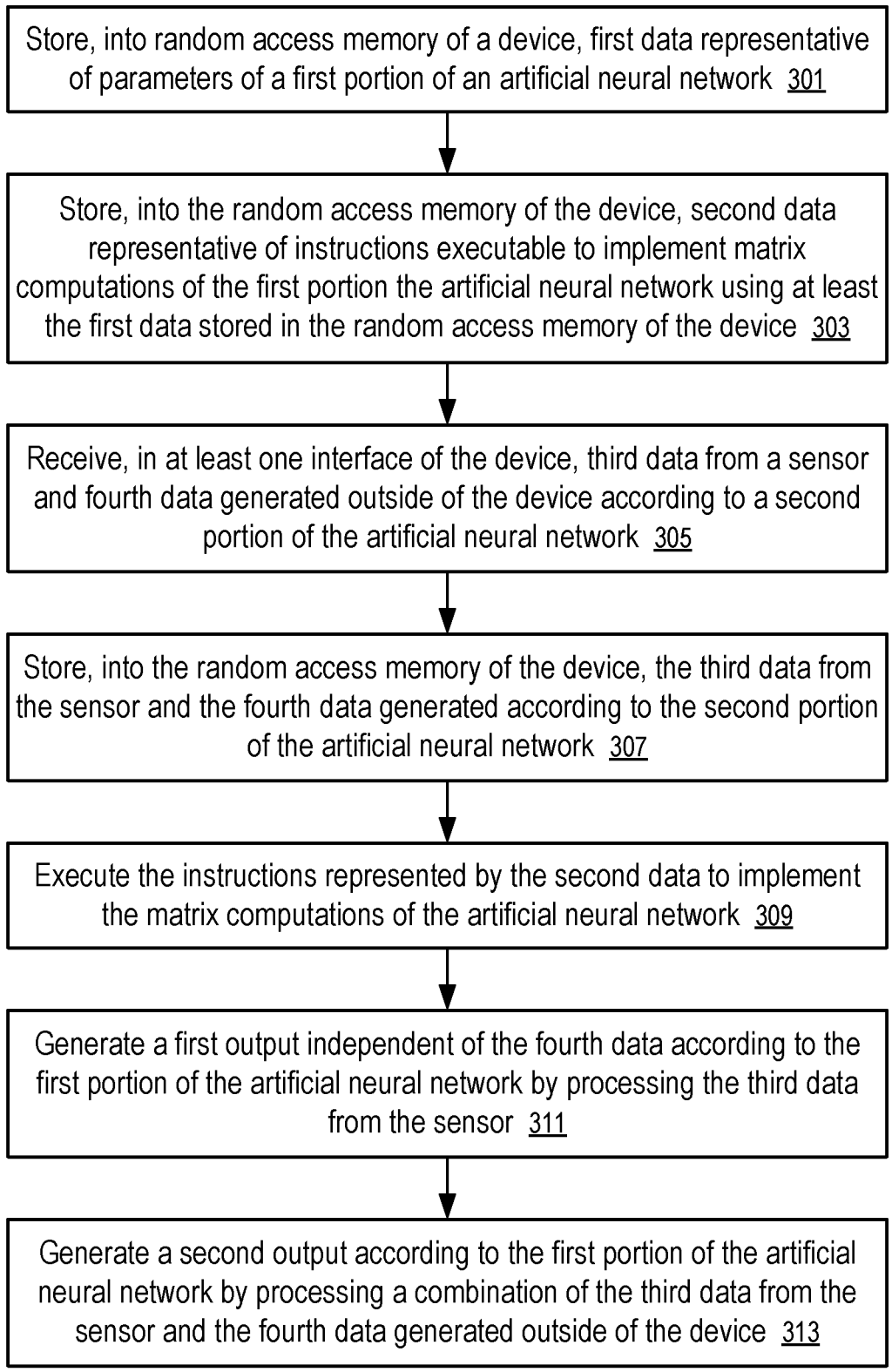
FIG. 12 shows a method of sensor fusion according to one embodiment.

FIG. 12 shows a method of sensor fusion according to one embodiment. For example, the method of FIG. 12 can be implemented in the integrated circuit device (101) of FIG. 1, FIG. 6, FIG. 7, FIG. 8 and/or the system of FIG. 5.

At block 301, first data representative of parameters of a first portion of an artificial neural network (201) is stored into random access memory (105) of a device (e.g., 101, 241 or 245).

At block 303, second data representative of instructions executable to implement matrix computations of the first portion of the artificial neural network (201) using at least the first data is stored into the random access memory (105) of the device (e.g., 101, 241, or 245).

At block 305, at least one interface (e.g., 107, 227, and/or 237) of the device (e.g., 101, 241, or 245) receives third data from a sensor (e.g., 231) and fourth data generated outside of the device according to a second portion of the artificial neural network (201).

In some implementations, the sensor (e.g., 231) is configured within the device (e.g., as illustrated in FIG. 11). Thus, the data from the sensor (e.g., 231) can be received in the random access memory (105) via an internal connection (e.g., 119).

At block 307, the least one interface (e.g., 107, 227, and/or 237) stores into the random access memory (105) of the device (e.g., 101, 241, or 245), the third data from the sensor (e.g., 231) and the fourth data generated according to the second portion of the artificial neural network (201).

At block 309, at least one processing unit (e.g., 111) of the device (e.g., 101, 241, or 245) executes the instructions represented by the second data to implement the matrix computations of the first portion the artificial neural network (201).

At block 311, the device (e.g., 101, 241, or 245) generates a first output independent of the fourth data according to the first portion of the artificial neural network (201) by processing the third data from the sensor (e.g., 231).

For example, the first output can include an identification or classification of an object determined independent of the fourth data generated outside of the device (e.g., 101, 241, or 245) according to the second portion of the artificial neural network (201).

At block 313, the device (e.g., 101, 241, or 245) generates a second output according to the first portion of the artificial neural network (e.g., 201) by processing a combination of the third data from the sensor (e.g., 231) and the fourth data generated outside of the device. For example, the fourth data can be generated by another device (243) according to the second portion of the artificial neural network (201).

For example, the sensor (e.g., 231) configured in or connected to the device (e.g., 101, 241, or 245) can be a first sensor (e.g., a first imaging device). The fourth data can be generated, according to the second portion of the artificial neural network, based on an input from a second sensor (e.g., 233) configured outside of the device (e.g., 101, 241, or 245). For example, the second sensor (e.g., 233) can be configured in or connected to another device (243).

For example, the first sensor (e.g., 231) and the second sensor (e.g., 233) are imaging sensors, such as a radar imaging sensor, a lidar imaging sensor, an ultrasound imaging sensor, an image sensor of a digital camera, an infrared imaging sensor, etc.

For example, the second output can include an identification or classification of the object determined based on both the first sensor (e.g., 231) and the second sensor (e.g., 233).

Optionally, computation of a third portion of the artificial neural network (201) is configured outside of the device (e.g., 101, 241, or 245); and the at least one interface of the device (e.g., 101, 241, or 245) is configured to provide at least a portion of the first output to outside of the device as an input to the third portion of the artificial neural network (201).

For example, the third portion can be implemented in another device (e.g., 243) to generate an output based on the sensor (231) and another sensor (e.g., 233). Optionally, the third portion can generate a result that is redundant to the second output.

For example, the portion of the first output generated in the device (e.g., 101, 241, or 245) can include features in the third data from the sensor (e.g., 231) recognized via the first portion of the artificial neural network (201). The recognized features have a data size smaller than the original sensor data from the sensor (e.g., 231). The recognized features can be transmitted to another device (e.g., 243) to generate a sensor fusion output based on the sensor (e.g., 231) and one or more other sensors (e.g., 233).

Optionally, the device (e.g., 101, 241, or 245) is further configured to communicate through the at least one interface (e.g., 107, 227, and/or 237) to identify an external device (e.g., 243) operable to implement matrix computations of the third portion of the artificial neural network (201) and write the portion of the first output into random access memory (105) of the external device (e.g., 243).

Optionally, the device (e.g., 101, 241, or 245) is further configured to communicate through the at least one interface (e.g., 107, 227, and/or 237) to determine whether to perform computation to generate the second output. The first output can be generated independent of whether the computation to generate the second output is performed.

Optionally, the device (e.g., 101, 241, or 245) is further configured to communicate through the at least one interface (e.g., 107, 227, and/or 237) to identify the external device (e.g., 243) that is operable to supply the fourth data and to obtain or read the fourth data from the random access memory (105) of the external device (e.g., 243).

Optionally, the device (e.g., 101, 241, or 245) includes a central process unit configured to run an application (235) stored in the random access memory (105). The application (235) can include a compiler (203) configured to partition, based on a description of the artificial neural network (201), the artificial neural network (201) into portions. The compiler (203) can generate, from the description of the artificial neural network (201), data representative of parameters of portions of the artificial neural network (201) and data representative of instructions executable to implement matrix computations of the portions of the artificial neural network (201). Further, the application can distribute computations of the portions of the artificial neural network to a plurality of devices (e.g., 243) by storing the DLA instructions (205) and matrices (207) of the respective portions into the random access memory (105) of the respective devices (e.g., 243).

Optionally, the at least one interface (e.g., 107, 227, and/or 237) of the device (e.g., 101, 241, or 245) can include a plurality of interfaces configured to be connected to the plurality of devices (e.g., 243) over a plurality of serial connections respectively. For example, the device (e.g., 101, 241, or 245) running the application (235) can dynamically distribute computation tasks of the portions of the artificial neural network to the plurality of devices (e.g., 243) based on current or predicted workloads of the respective devices (e.g., 243).

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   partitioning, based on a description of an artificial neural network, the artificial neural network into a first portion and a second portion;
   receiving, in a device having the first portion of the artificial neural network, data from a sensor and an input generated outside of the device according to the second portion of the artificial neural network, the artificial neural network configured to generate at least one output based on the sensor;
   executing, by the device, instructions generated based on the description to implement matrix computations of the first portion of the artificial neural network to generate a first output independent of the input generated outside of the device; and
   generating, by the device, a second output according to the first portion of the artificial neural network based on a combination of the data from the sensor and the input generated outside of the device.

2. The method of claim 1, further comprising:
   writing, into a random access memory of the device, instructions of an application;
   executing, by a central process unit of the device, the instructions of the application to convert a description of the artificial neural network into:
      data representative of parameters of portions of the artificial neural network, and
      data representative of instructions executable to implement matrix computations of the portions of the artificial neural network;
   distributing computation tasks of the portions of the artificial neural network to a plurality of devices.

3. The method of claim 2, wherein the artificial neural network is configured to generate an output from a plurality of imaging devices, including the sensor; a portion of the plurality of imaging devices is not configured in the device; a portion of the first output includes features recognized from the data from the sensor by the first portion of the artificial neural network; and the method further comprises:
   communicating, via at least one interface of the device, with at least one external device to obtain the input generated outside of the device according to the second portion of the artificial neural network; and
   communicating, via the at least one interface, with the at least one external device to provide the portion of the first output as an input to a third portion of the artificial neural network.

4. The method of claim 3, wherein an output of the artificial neural network includes an identification or classification of an object captured in image data generated by the plurality of imaging devices.

5. A device, comprising:
random access memory;
at least one interface configured to receive data from a sensor as an input to at least a first portion of an artificial neural network and to receive an input generated outside of the device according to a second portion of the artificial neural network, the artificial neural network configured to generate at least one output based on the sensor; and
at least one processing unit coupled to the random access memory and the at least one interface, and configured to:
partition, based on a description of the artificial neural network, the artificial neural network into the first portion and the second portion; and
execute instructions generated based on the description to implement matrix computations of the first portion of the artificial neural network, the first portion of the artificial neural network configured to process the data from the sensor to generate a first output independent of the input generated outside of the device and to generate a second output based on a combination of the data from the sensor and the input generated outside of the device.

6. The device of claim 5, further comprising:
the sensor configured within the device, wherein the first output includes an identification or classification of an object determined independent of the input generated outside of the device according to the second portion of the artificial neural network.

7. The device of claim 6, wherein the sensor is a first sensor; and the input generated according to the second portion of the artificial neural network is based on data from a second sensor configured outside of the device.

8. The device of claim 7, wherein the first sensor and the second sensor are imaging sensors; and the second output includes an identification or classification of the object determined based on both the first sensor and the second sensor.

9. The device of claim 5, wherein computation of a third portion of the artificial neural network is configured outside of the device; and the at least one interface is configured to provide at least a portion of the first output to outside of the device as an input to the third portion of the artificial neural network.

10. The device of claim 9, wherein the portion of the first output includes features in the data from the sensor recognized via the first portion of the artificial neural network.

11. The device of claim 9, wherein the device is further configured to communicate via the at least one interface to identify an external device operable to implement matrix computations of the third portion of the artificial neural network and write the portion of the first output into random access memory of the external device.

12. The device of claim 5, wherein the device is further configured to communicate through the at least one interface to determine whether to perform computation to generate the second output; and wherein the first output is generated independent of whether the computation to generate the second output is performed.

13. The device of claim 5, further comprising:
a central process unit configured to run an application stored in the random access memory, wherein the application is configured to generate, based on a description of the artificial neural network,
data representative of parameters of portions of the artificial neural network, and
data representative of instructions executable to implement matrix computations of the portions of the artificial neural network;
wherein the application is further configured to distribute computations of the portions of the artificial neural network to a plurality of devices; and
wherein the at least one interface includes a plurality of interfaces configured to be connected to the plurality of devices over a plurality of serial connections respectively.

14. The device of claim 5, further comprising:
an integrated circuit die of a Field-Programmable Gate Array (FPGA) or Application Specific Integrated circuit (ASIC) implementing a Deep Learning Accelerator, the Deep Learning Accelerator comprising the at least one processing unit, and a control unit configured to load the instructions from the random access memory for execution.

15. The device of claim 14, wherein the at least one processing unit includes a matrix-matrix unit configured to operate on two matrix operands of an instruction;
wherein the matrix-matrix unit includes a plurality of matrix-vector units configured to operate in parallel;
wherein each of the plurality of matrix-vector units includes a plurality of vector-vector units configured to operate in parallel; and
wherein each of the plurality of vector-vector units includes a plurality of multiply-accumulate units configured to operate in parallel.

16. The device of claim 15, wherein the random access memory and the Deep Learning Accelerator are formed on separate integrated circuit dies and connected by Through-Silicon Vias (TSVs); and the device further comprises:
an integrated circuit package configured to enclose at least the random access memory and the Deep Learning Accelerator.

17. An apparatus, comprising:
memory configured to store first data representative of parameters of a first portion of an artificial neural network, second data representative of instructions generated based on a description of the artificial neural network and executable to implement matrix computations of the first portion of the artificial neural network using at least the first data stored in the memory, third data from a sensor, and fourth data generated outside of the apparatus according to a second portion of the artificial neural network, wherein the first and second portions of the artificial neural network are partitioned from the artificial neural network based on the description;
and
a Field-Programmable Gate Array (FPGA) or Application Specific Integrated circuit (ASIC) having:
a memory interface configured to access the memory via a connection to the memory; and
at least one processing unit configured to execute the instructions to implement the matrix computations of the first portion of the artificial neural network, the first portion of the artificial neural network configured to process the third data from the sensor to generate a first output independent of the fourth data and to generate a second output based on a combination of the third data from the sensor and the fourth data.

18. The apparatus of claim 17, further comprising:
a central process unit configured to execute instructions of a compiler configured to partition the artificial neural network into the first and second portions, generate from the description of the artificial neural network to a plurality of datasets representative of the portions of the artificial neural network, and distribute the plurality of datasets to a plurality of integrated circuit devices, each of the plurality of integrated circuit devices operable to implement computations of a portion of the artificial neural network based on a corresponding dataset in the plurality of datasets.

19. The apparatus of claim 17, further comprising:
the sensor configured within the apparatus;
wherein the first output includes a first identification or classification of an object determined independent of the fourth data; and
wherein the second output includes a second identification or classification of the object determined from the third data and the fourth data.

20. The apparatus of claim 17, further comprising at least one interface configured to receive the fourth data and includes a serial communications interface to an integrated circuit device configured outside of the apparatus and having an FPGA or ASIC operable to implement matrix computations of the artificial neural network; and the apparatus includes a radar imaging device, a lidar imaging device, a digital camera, an infrared camera, or an ultrasound imaging device, or any combination thereof.

* * * * *